United States Patent
Hopman et al.

(10) Patent No.: US 9,146,164 B2
(45) Date of Patent: Sep. 29, 2015

(54) PRESSURE TRANSDUCER SUBSTRATE WITH SELF ALIGNMENT FEATURE

(71) Applicants: Wico Hopman, Enschede (NL); George Van Der Donk, Holten (NL); Maarten Van Noorden, Linde (NL); Sean DiStefano, Franklin, MA (US)

(72) Inventors: Wico Hopman, Enschede (NL); George Van Der Donk, Holten (NL); Maarten Van Noorden, Linde (NL); Sean DiStefano, Franklin, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 259 days.

(21) Appl. No.: 13/788,255

(22) Filed: Mar. 7, 2013

(65) Prior Publication Data

US 2014/0251030 A1    Sep. 11, 2014

(51) Int. Cl.
| | |
|---|---|
| G01L 7/08 | (2006.01) |
| G01L 1/14 | (2006.01) |
| G01L 9/00 | (2006.01) |
| G01L 1/22 | (2006.01) |

(52) U.S. Cl.
CPC .............. *G01L 1/146* (2013.01); *G01L 9/0042* (2013.01); *G01L 9/0044* (2013.01); *G01L 9/0072* (2013.01); *G01L 9/0075* (2013.01); *G01L 1/2243* (2013.01); *G01L 7/08* (2013.01); *G01L 7/082* (2013.01); *G01L 9/0016* (2013.01); *G01L 9/0047* (2013.01); *G01L 9/0054* (2013.01); *G01L 9/0073* (2013.01)

(58) Field of Classification Search
CPC ... G01L 9/0042; G01L 9/0054; G01L 9/0073; G01L 9/0016; G01L 9/0047; G01L 9/0075; G01L 7/082; G01L 7/08; G01L 1/2243

USPC .................................................... 73/715, 716
See application file for complete search history.

(56) References Cited

U.S. PATENT DOCUMENTS

| | | | | |
|---|---|---|---|---|
| 4,400,681 | A | * | 8/1983 | Brown et al. ...................... 338/4 |
| 5,144,843 | A | * | 9/1992 | Tamura et al. ................... 73/727 |
| 5,209,121 | A | * | 5/1993 | Hafner ............................. 73/727 |
| 5,448,444 | A | * | 9/1995 | Provenzano et al. ....... 361/283.4 |
| 7,383,737 | B1 | * | 6/2008 | Lin et al. ......................... 73/718 |
| 8,056,752 | B2 | * | 11/2011 | Carnevali ....................... 220/372 |
| 2001/0039837 | A1 | * | 11/2001 | Tanizawa et al. ............... 73/715 |
| 2004/0146719 | A1 | * | 7/2004 | Baney et al. ................... 428/426 |
| 2005/0252300 | A1 | * | 11/2005 | Miller ............................. 73/715 |
| 2006/0000289 | A1 | * | 1/2006 | Jonsson .......................... 73/723 |
| 2006/0053894 | A1 | * | 3/2006 | Kunda et al. .................... 73/715 |
| 2010/0219487 | A1 | * | 9/2010 | Donis ............................ 257/414 |
| 2010/0239109 | A1 | * | 9/2010 | Lutz et al. ...................... 381/190 |
| 2013/0336511 | A1 | * | 12/2013 | Underbrink et al. .......... 381/369 |

FOREIGN PATENT DOCUMENTS

| | | | |
|---|---|---|---|
| EP | 085584 | A2 * | 7/1998 |
| EP | 1211497 | A2 * | 6/2002 |

* cited by examiner

*Primary Examiner* — Lisa Caputo
*Assistant Examiner* — Jonathan Dunlap
(74) *Attorney, Agent, or Firm* — Chapin IP Law, LLC

(57) ABSTRACT

In an embodiment, an apparatus includes a first substrate. The first substrate may have a first side for accommodating a first diaphragm. The first substrate may also have a second side. The second side may include a polygonal-shaped depression that is sized to accommodate a second diaphragm associated with a second substrate. The first substrate and first diaphragm may be included in a first assembly and the second substrate and second diaphragm may be included in a second assembly. The first assembly and the second assembly may be included in a stack where at least a portion of the second diaphragm is positioned to fit inside the polygonal-shaped depression in the stack.

12 Claims, 6 Drawing Sheets

PRESSURE TRANSDUCER SUBSTRATE WITH SELF ALIGNMENT FEATURE

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

A pressure transducer may include a substrate and a diaphragm. The diaphragm may be attached to the substrate. The diaphragm may include an element (e.g., a capacitor's plate) that may be part of a sensor used to sense movement of the diaphragm in response to, for example, changes in pressure applied to the diaphragm.

A shape of a diaphragm used by a pressure transducer may influence a cost associated with producing the pressure transducer. For example, a pressure transducer that utilizes a circular (round) diaphragm may be more costly to produce than a pressure transducer that utilizes a polygonal (e.g., square) diaphragm.

Factors that may contribute to the difference in cost may be associated with the shape of the diaphragm. For example, utilizing a circular diaphragm may involve accurate pressing that may include carefully orienting the diaphragm to a substrate when attaching the diaphragm to the substrate. A square diaphragm, on the other hand, may be easily diced out of sheets of alumina and easily attached to a substrate, which may make a pressure transducer that utilizes the square diaphragm less costly to produce than if the pressure transducer were to use a circular diaphragm.

Figure 1:
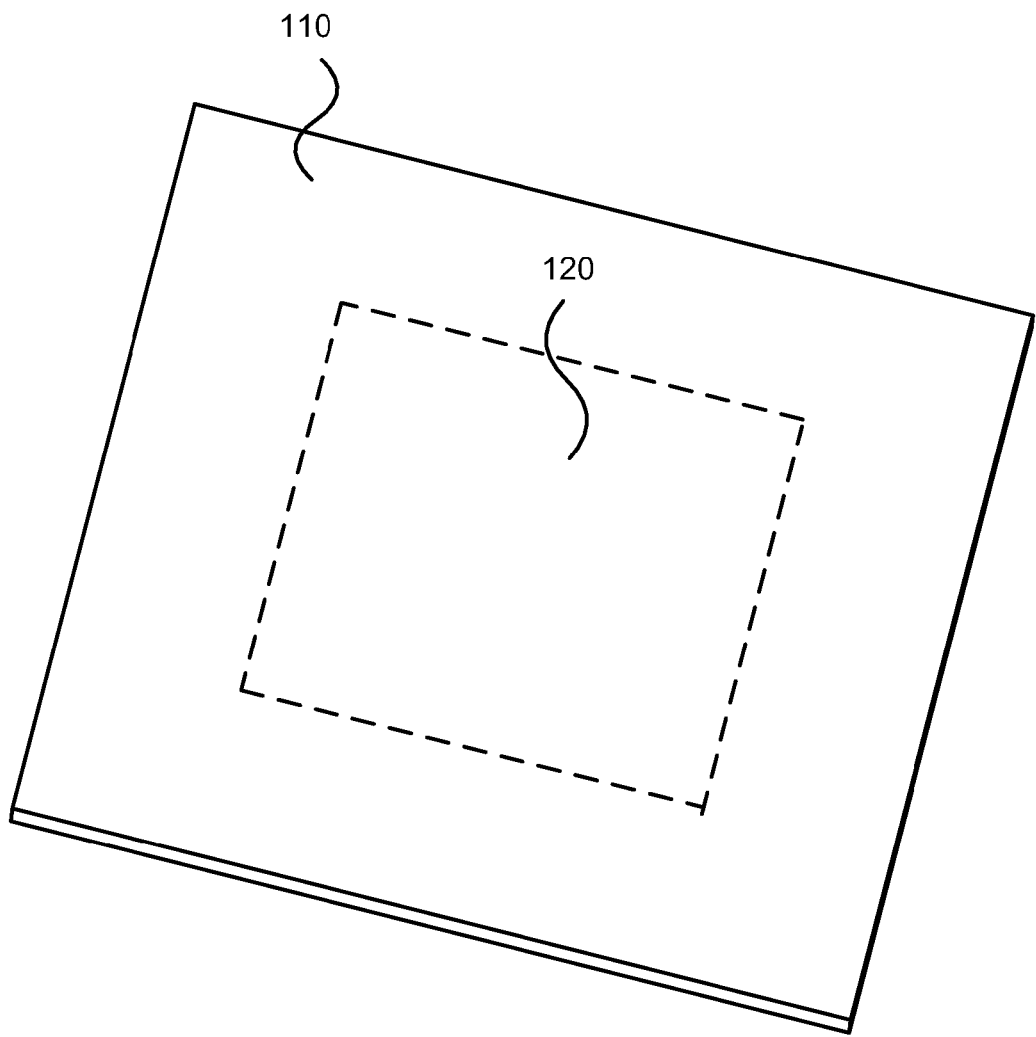
FIG. 1 illustrates an example embodiment of a diaphragm that may be used with a substrate.

FIG. 1 illustrates an example embodiment of a diaphragm 110. The diaphragm 110 may be part of a transducer, such as a pressure transducer (e.g., an automotive pressure transducer (APT)). The diaphragm 110 may be made of a ceramic material (e.g., ceramic powder) although other materials that may be suitable for implementing diaphragm 110 may be used, such as, for example, glass or a crystalline material.

Referring to FIG. 1, the diaphragm may be shaped as a polygon. For example, the diaphragm 110 may be shaped as a rectangle, although other polygonal shapes may be used, such as, for example, an octagon or a square. Diaphragm 110 may include an element 120 that may be part of a sensor that may be used to sense movement of the diaphragm 110.

Element 120 may include, for example, an electronic module assembly (EMA). The EMA may include, for example, an electrode pattern and/or electrical components. In an embodiment, element 120 may be printed on diaphragm 110 using, for example, gold.

Element 120 may include one or more electrodes (e.g., gold leads) that may be used to convey signals (e.g., electronic signals) to and/or from the element 120. For example, element 120 may include a plate. The plate may be part of a capacitive sensing element that may include a corresponding plate on a substrate bonded to diaphragm 110. Element 120 may include one or more electrodes that connect to the plate included in element 120.

Figure 2:
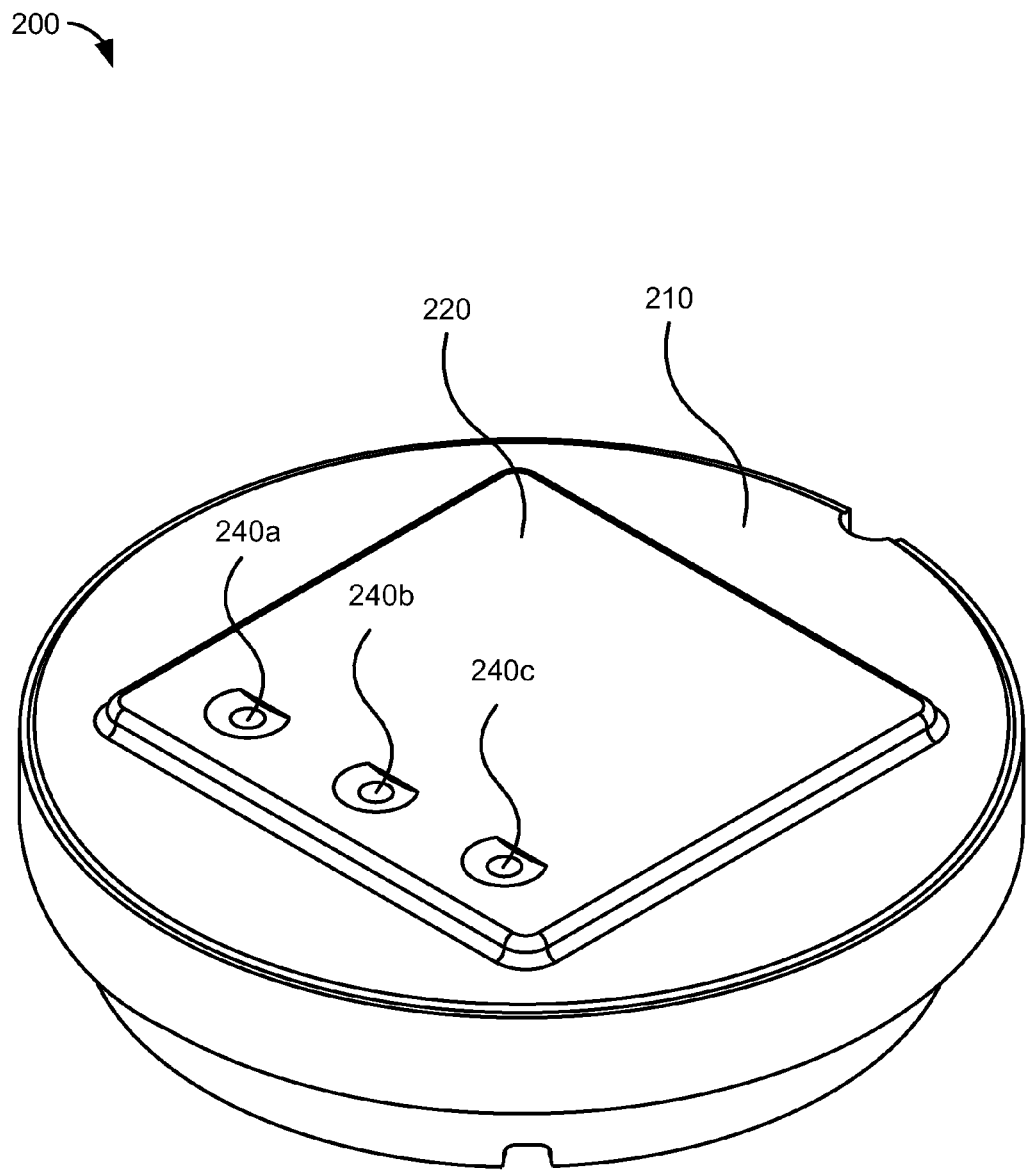
FIG. 2 illustrates an example embodiment of a first side of a substrate.

FIG. 2 illustrates an example embodiment 200 of a first side of a substrate 210. The first side may accommodate diaphragm 110. The first side may be referred to as a diaphragm side in that it may accommodate diaphragm 110.

The substrate 210 may be part of a transducer, such as a pressure transducer. The substrate 210 may be made of a ceramic material although other materials that may be suitable for implementing substrate 210 may be used, such as, for example glass, a crystalline material, or other suitable materials.

Referring to FIG. 2, the substrate 210 may be circularly shaped. The first side may include a protrusion 220 and one or more holes 240a-c. The protrusion 220 may be shaped as a polygon (e.g., a square) and may be raised from the surface of the substrate 210. The protrusion 220 may provide a platform for diaphragm 110 which may be bonded to substrate 210 at the protrusion 220. The protrusion 220 may include one or more holes 240a-c, which may be used to accommodate one or more electrical connections to an element 120 that may be contained on the diaphragm 110. The electrical connections may be made using, for example, one or more electrically conductive wires (not shown) that may be fed through the holes 240a-c to one or more electrodes that may be associated with element 120.

Figure 3:
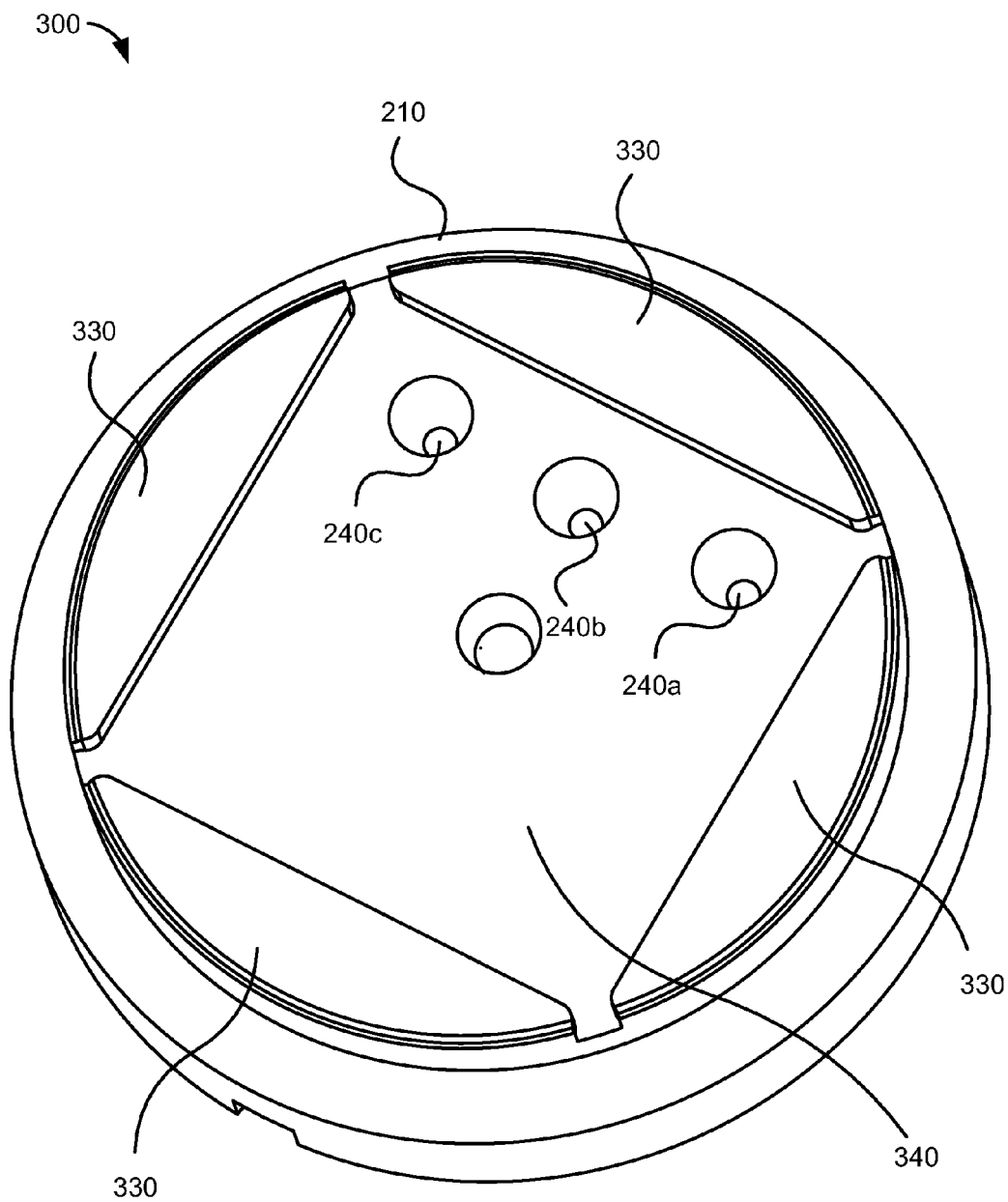
FIG. 3 illustrates an example embodiment of a second side of a substrate.

FIG. 3 illustrates an example embodiment 300 of a second side of substrate 210. The second side may be a side on the substrate 210 that is opposite of the first side of the substrate 210. The second side may be referred to as an EMA side in that it may accommodate a diaphragm 110 (from a different substrate 210) that may include an EMA.

Referring to FIG. 3, the second side may include a depression 340 that may be surrounded by a ridge 330. The ridge 330 may be slotted. Slotting ridge 330 may, for example, enhance an ability to stack assemblies that may contain the substrate 210. Further, slotting ridge 330 may, for example, impose an orientation of assemblies (containing the substrate 210) in a stack of assemblies. In addition, slotting ridge 330 may, for example, obviate damaging (e.g., chipping) a diaphragm 110 when assemblies containing a diaphragm 110 and a substrate 210 are stacked.

The shape of the depression 340 may be defined by one or more criteria. For example, the shape of depression 340 may be defined by a shape of the ridge 330, shape of a diaphragm 110 used with another substrate 210, shape of an EMA associated with (e.g., attached to) the substrate 210, shape of an EMA associated with another substrate 210, and/or other criteria. The depression 340 may be shaped to accommodate, for example, an assembly containing a different substrate 210 when the assembly is stacked with an assembly that includes the substrate 210 illustrated in FIG. 3. Stacking of assemblies that include substrates 210 and diaphragms 110 will be discussed further below.

The height of the ridge 330 and/or depth of the depression 340 may also be defined by one or more criteria. For example, the depth of the depression 340 may be defined by some combination of the height of the ridge 330, thickness of the diaphragm 110, height of a protrusion 220 associated with another substrate 210, thickness and/or height of an EMA, and/or other criteria.

Figure 4:
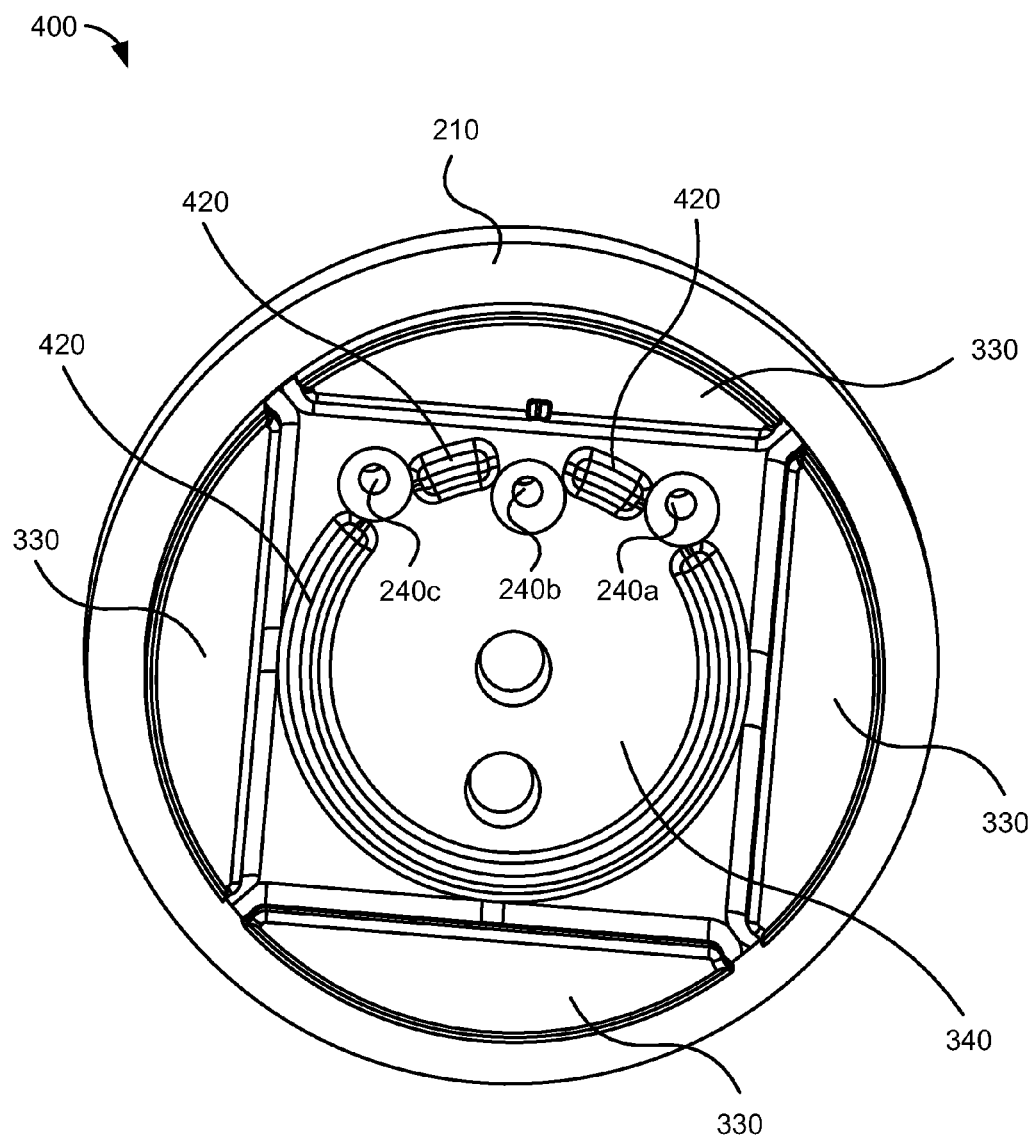
FIG. 4 illustrates another example embodiment of a second side of a substrate.

FIG. 4 illustrates another example embodiment 400 of a second side of substrate 210 that contains a supporting area 420. Referring to FIG. 4, the supporting area 420 may be contained in the depression 340. The supporting area 420 may be circular (e.g., shaped as a ring) although in other embodiments supporting area 420 may be shaped differently. The supporting area 420 may be raised from the surface of depression 340. A height of the supporting area 420 as measured from the surface of the depression 340 may be less than a height of the ridge 330 as also measured from the surface of the depression 340.

For example, the height of the ridge 330 when measured from the depression 340 may be 1.55 millimeters (mm) and the height of the supporting area 420 may be when measured from the depression 340 may be 0.5 mm. As will be described further below, the supporting area 420 may provide support for a diaphragm 110 that may be associated with another substrate 210 when the, for example, the diaphragm 110 is being bonded to the other substrate 210.

Figure 5:
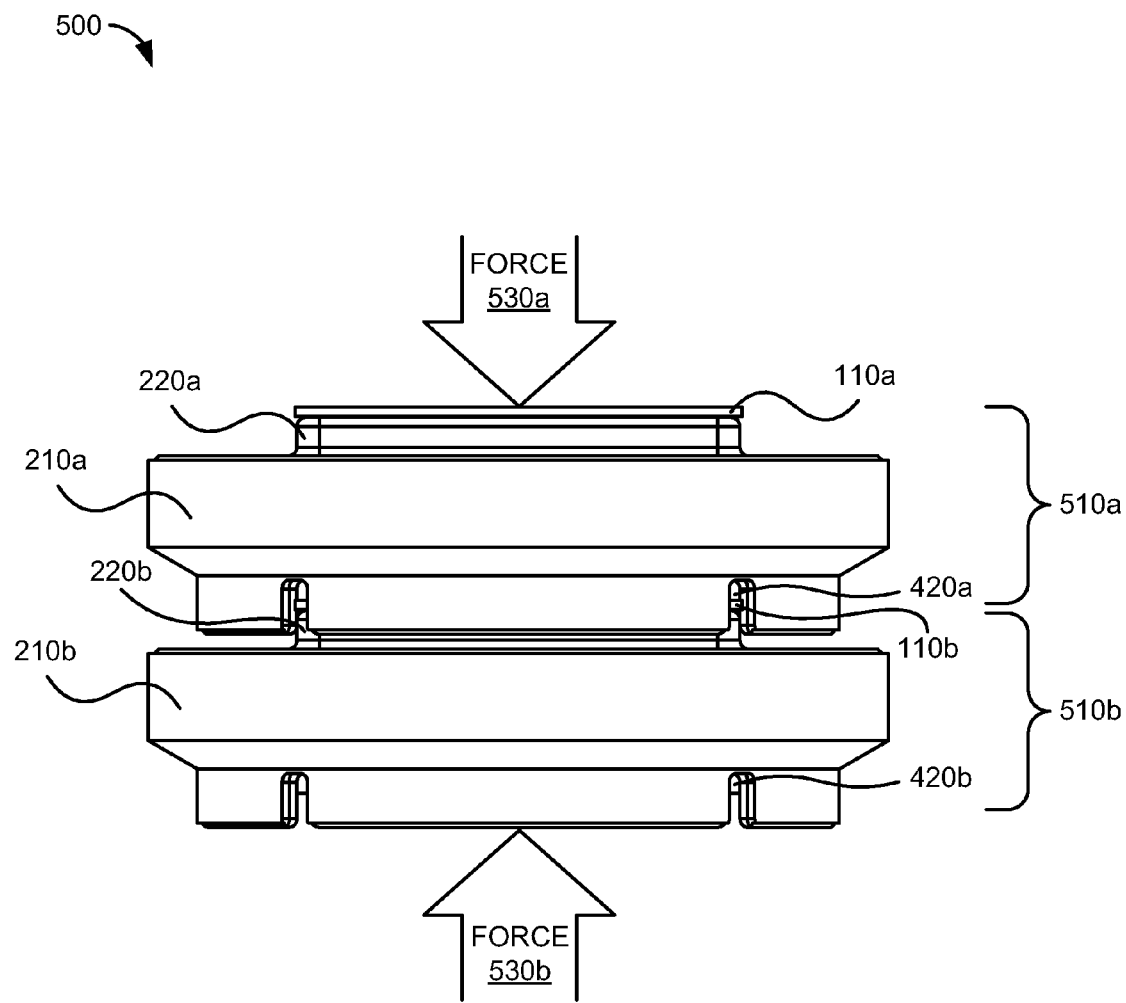
FIG. 5 illustrates an example stack of a plurality of assemblies where an assembly includes a diaphragm and a substrate.

FIG. 5 illustrates an example of a stack 500 of a plurality of assemblies 510a-b that contain substrates 210a-b and diaphragms 110a-b, respectively. The assemblies 510a-b may be stacked in the stack 500 prior to bonding diaphragms 110a-b to their respective substrates 210a-b. The stack 500 may be placed in a heated environment (e.g., kiln, furnace) to bond the diaphragms 110a-b to their respective substrates 210a-b.

For example, referring to FIG. 5, suppose diaphragm 110a and substrate 210a form assembly 510a and diaphragm 110b and substrate 210b form assembly 510b and that substrates 210a-b have a second side as illustrated in FIG. 4. Further suppose that the diaphragm 110a is to be bonded to substrate 210a and diaphragm 110b is to be bonded to substrate 210b in a heated environment using, for example, a sealing glass.

The assemblies 510a-b may be stacked as illustrated in FIG. 5 to form stack 500 prior to bonding diaphragms 110a-b to substrates 210a-b, respectively. Specifically, diaphragm 110b and/or protrusion 220b of assembly 510b may be positioned to fit into a depression 340 associated with substrate 210a, where the diaphragm 110b may make contact with a supporting area 420a that may be contained in the depression 340 associated with substrate 210a. After the stack 500 is formed, the stack may be placed in a heated environment that may be used to bond diaphragms 110a-b to substrates 210a-b, respectively, using the sealing glass.

While FIG. 5 illustrates an example stack 500 that includes two assemblies 510a-b it should be noted that stack 500 may include one or more additional assemblies 510. For example, additional assemblies 510 may be stacked on top of assembly 510a and/or under assembly 510b. If an additional assembly 510 is stacked on assembly 510a, the additional assembly 510 may include a depression 340 that may be sized to accommodate substrate 210a and/or protrusion 220a. If an additional assembly 510 is stacked under assembly 510b, the additional assembly 510 may include a substrate 210 and/or protrusion 220 that may be sized to accommodate a depression 340 and/or supporting area 420b associated with substrate 210b. The substrate 210 of the assembly 510 may make contact with the depression 340 and/or supporting area 420b associated with substrate 210b.

Referring back to FIG. 5, force 530a and/or force 530b may be applied to the stacked assemblies 510a-b, for example, in the heated environment. The forces 530a-b may be applied to assist bonding the diaphragms 110a-b to their respective substrates 210a-b in the heated environment.

For example, assemblies 510a-b may be stacked as illustrated in FIG. 5 and the stacked assemblies 510a-b may be placed in a fixture that may contain a fixed stop that may make contact with the second side of substrate 210b and an adjustable stop that may make contact with diaphragm 110a. The adjustable stop may be adjusted to provide force 530a while diaphragms 110a-b are bonded to their respective substrates 210a-b in a heated environment.

Figure 6:
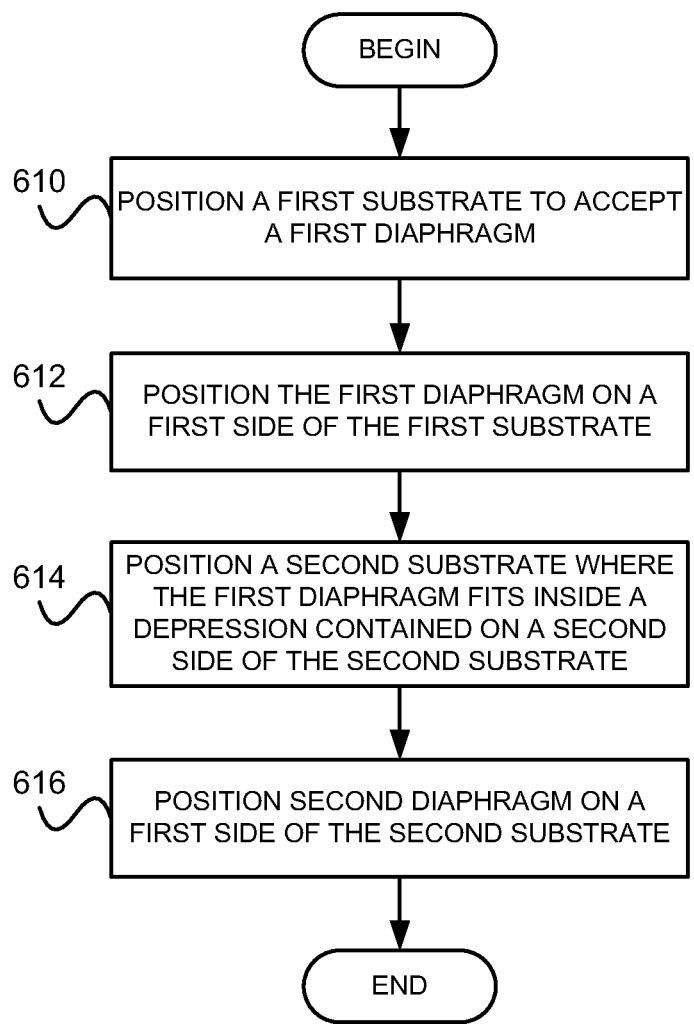
FIG. 6 illustrates a flow chart of example acts that may be used to generate a stack that includes a first assembly having a first substrate and a first diaphragm and a second assembly having a second substrate and a second diaphragm.

FIG. 6 illustrates a flow chart of example acts that may be used to generate a stack that includes a first assembly having a first substrate and a first diaphragm and a second assembly having a second substrate and a second diaphragm. The first and second substrates may be circularly shaped. Referring to FIG. 6, at block 610, the first substrate of the first assembly may be positioned to accept a first diaphragm. The first substrate may include a second side and a first side. The second side may include a depression. The depression may be polygonal shaped.

At block 612, the first diaphragm of the first assembly may be positioned on the first substrate. The first diaphragm may be positioned on the first side of the first substrate. The first side of the first substrate may include a protrusion and the first substrate may be positioned to fit on the protrusion.

At block 614, the second substrate may be positioned where at least a portion of the first diaphragm is positioned to fit inside the depression on the second side of the second substrate. Note that this may include the entire first diaphragm being positioned to fit inside the depression on the second side of the second substrate. Moreover, if the first substrate includes a protrusion (e.g., such as protrusion 220) and the first diaphragm is positioned on the protrusion, at least a portion of the protrusion may be fitted into the depression on the second side of the second substrate. Moreover, if the depression on the second side of the second substrate includes a supporting area (e.g., such as supporting area 420), the first diaphragm may be positioned in the depression on the second side of the second substrate such that at least a portion of the first diaphragm makes contact with at least a portion of the supporting area.

At block 616, the second diaphragm is positioned on the second substrate. The second diaphragm may be positioned on a first side of the second substrate. If the second substrate includes a protrusion on the first side, the diaphragm may be positioned on the protrusion.

For example, referring to FIGS. 5 and 6, stack 500 may be generated as follows. Substrate 210b may be positioned to accept diaphragm 110b on protrusion 220b. Diaphragm 110b may be positioned on protrusion 220b to form assembly 510b. Specifically, diaphragm 110b may be positioned on protrusion 220b such that holes 240a-c (FIG. 2) may align with electrodes that may be contained on diaphragm 110b. The electrodes may provide an electrical connection to an element 120 (FIG. 1) that may be contained on the diaphragm 110b.

Substrate 210a may be positioned on assembly 510b such that at least a portion of diaphragm 110b and/or protrusion 220b may fit within a depression 340 that may be contained on a second side of substrate 210a. The depression 340 may include a supporting area 420a that may make contact with at least a portion of diaphragm 110b.

Diaphragm 110a may be positioned on protrusion 220a to form assembly 510a. Force 530a and/or force 530b may be applied to the stacked assemblies 510a-b, for example, while the stacked assemblies 510a-b are present in a heated environment. Specifically, force 510a may be applied to diaphragm 110*a* and/or force 530*b* may be applied to substrate 220*b* while the stacked assemblies 510*a-b* are present in the heated environment.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIG. 6, the order of the acts may be modified in other implementations. Further, non-dependent acts may be performed in parallel.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. An apparatus comprising:
   a first circularly-shaped substrate having:
      a first side for accommodating a first diaphragm and a second side, the second side including a polygonal-shaped depression that is sized to accommodate a second diaphragm associated with a second circularly-shaped substrate, and
      a supporting area contained in the polygonal-shaped depression, the supporting area providing support for the second diaphragm when a first assembly containing the first circularly-shaped substrate and a second assembly containing the second diaphragm and the second circularly-shaped substrate are stacked.

2. The apparatus of claim 1, further comprising:
   the first diaphragm.

3. The apparatus of claim 2, wherein the first diaphragm is polygonal shaped.

4. The apparatus of claim 1, wherein the supporting area is shaped as a ring.

5. The apparatus of claim 1, wherein the first substrate is included in a pressure transducer.

6. The apparatus of claim 5, wherein the pressure transducer is an automotive pressure transducer (APT).

7. An apparatus comprising:
   a first circularly-shaped substrate having a first side for accommodating a first diaphragm and a second side, the second side including a polygonal-shaped depression that is sized to accommodate a second diaphragm associated with a second circularly-shaped substrate, and
   a protrusion on the first side, the protrusion providing a platform for the first diaphragm.

8. The apparatus of claim 7, wherein the protrusion is polygonal shaped.

9. The apparatus of claim 7, further comprising:
   the first diaphragm,
   wherein the first diaphragm is bonded to the protrusion.

10. The apparatus of claim 9, wherein the first diaphragm is bonded to the protrusion using a sealing glass.

11. The apparatus of claim 7, wherein the first substrate is included in a pressure transducer.

12. The apparatus of claim 11, wherein the pressure transducer is an automotive pressure transducer (APT).

* * * * *